United States Patent
Arab-Sadeghabadi et al.

(10) Patent No.: US 7,424,186 B2
(45) Date of Patent: Sep. 9, 2008

(54) TRANSDUCER MANDREL WITH ATTACHMENT FOR HOLDING FIBER BRAGG GRATING MOUNTING COLLAR

(75) Inventors: Akbar Arab-Sadeghabadi, Simi Valley, CA (US); Joseph Krystkowiak, Moorpark, CA (US); John Mansell, Thousand Oaks, CA (US); Sanan Shaibani, Woodland Hills, CA (US)

(73) Assignee: Northrop Grumman Guidance and Electronics Company, Ltd., Los Angeles, CA (US)

( * ) Notice: Subject to any disclaimer, the term of this patent is extended or adjusted under 35 U.S.C. 154(b) by 0 days.

(21) Appl. No.: 11/495,974

(22) Filed: Jul. 27, 2006

(65) Prior Publication Data

US 2008/0025668 A1    Jan. 31, 2008

(51) Int. Cl.
*G02B 6/00* (2006.01)
*G02B 6/34* (2006.01)
(52) U.S. Cl. ............................ 385/37; 385/12; 385/13
(58) Field of Classification Search .................... None
See application file for complete search history.

(56) References Cited

U.S. PATENT DOCUMENTS

| | | | |
|---|---|---|---|
| 6,233,374 B1 * | 5/2001 | Ogle et al. | 385/13 |
| 6,252,656 B1 * | 6/2001 | Wu et al. | 356/73.1 |
| 7,116,850 B2 * | 10/2006 | Woo | 385/13 |
| 7,245,791 B2 * | 7/2007 | Rambow et al. | 385/12 |
| 7,327,907 B2 * | 2/2008 | Shaibani et al. | 385/12 |
| 2006/0120675 A1 * | 6/2006 | Goldner et al. | 385/104 |

FOREIGN PATENT DOCUMENTS

GB        2 411 956 A        9/2005

* cited by examiner

*Primary Examiner*—Tina M Wong
(74) *Attorney, Agent, or Firm*—Lynn & Lynn

(57) ABSTRACT

A fiber optic acoustic transducer includes a mandrel having a first portion that preferably formed generally as a cylinder having a projection extending from one end. A grating collar also preferably formed in a generally cylindrical configuration. The grating collar has a passage extending therethrough so that it may mounted on the projection. An optical fiber has a sensor portion wound around the first portion of the mandrel and a second portion wound around the grating collar with a fiber Bragg grating being formed in the second portion of the optical fiber.

2 Claims, 1 Drawing Sheet

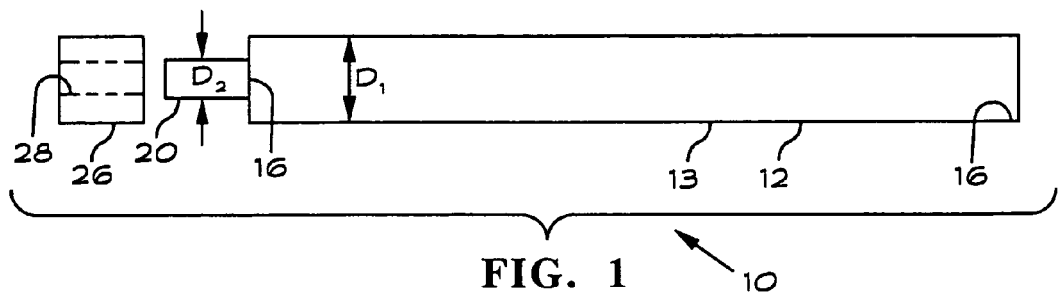
FIG. 1
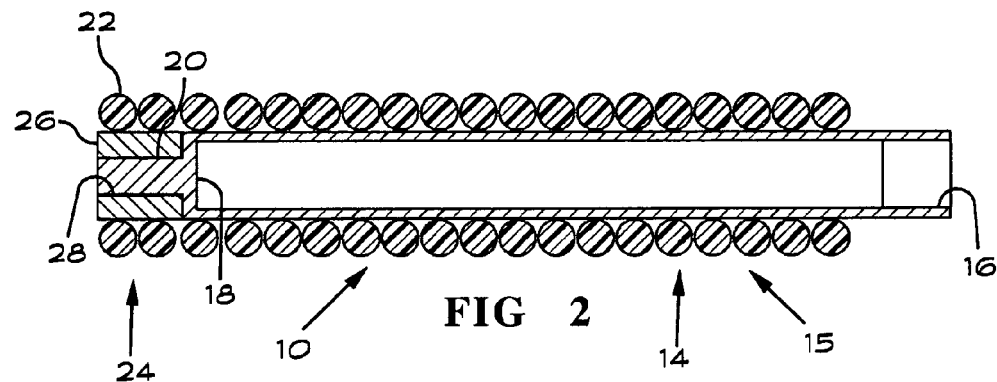
FIG 2
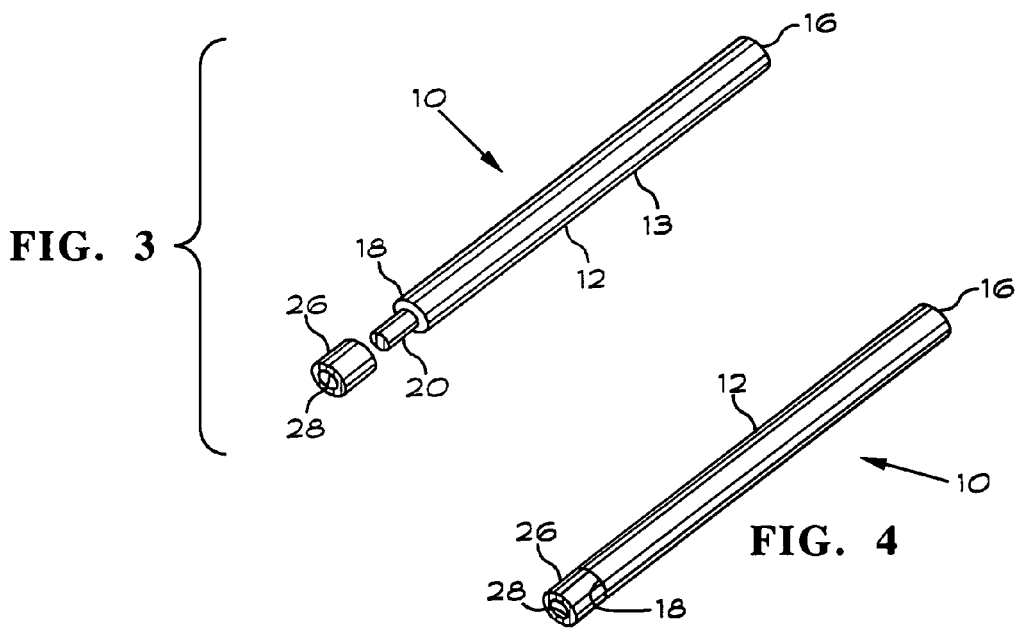
FIG. 3
FIG. 4

TRANSDUCER MANDREL WITH ATTACHMENT FOR HOLDING FIBER BRAGG GRATING MOUNTING COLLAR

BACKGROUND OF THE INVENTION

This invention relates generally to transducers suitable for forming fiber optic sensors. This invention relates particularly to fiber optic transducers that include a coil of optical fiber wound on a mandrel and including a Bragg grating formed in the optical fiber. Still more particularly, this invention relates to a transducer mandrel with an attached collar for mounting a fiber Bragg grating (FBG) and having a smooth transition from a fiber optic sensor coil to the FBG.

A fiber optic sensor typically includes a transducer comprising a mandrel that supports a coil of optical fiber. Depending upon the configuration of the mandrel, a fiber optic transducer may be made to be sensitive to changes in temperature, pressure or sound intensity. In a sensor array having a plurality of such transducers, an FBG typically is mounted between the optical fiber coils on the mandrels. The purpose of the FBG is to reflect an optical signal of a selected wavelength back through the optical fiber to a detector and to transmit optical signals of other wavelength to subsequent transducers in the array. Typically the FBG is wound on a grating collar that is slid over an end of the corresponding sensor mandrel. It has been found that supporting the grating collar on the sensor mandrel causes a differential strain on the grating collar, which in turn causes unwanted changes in the optical characteristics of the FBG.

SUMMARY OF THE INVENTION

A fiber optic acoustic transducer according to the present invention includes a mandrel having a first portion that preferably formed generally as a cylinder having a projection extending from one end. A grating collar also preferably formed in a generally cylindrical configuration and having a passage extending therethrough is mounted on the projection. An optical fiber has a sensor portion wound around the first portion of the mandrel and a second portion wound around the grating collar with a fiber Bragg grating being formed in the second portion of the optical fiber.

BRIEF DESCRIPTION OF THE DRAWINGS

FIG. 1 is an elevation view of the invention showing a sensor mandrel and a grating collar formed to be mounted on an end of the sensor mandrel;

FIG. 2 is a cross sectional view of the invention of FIG. 1;

FIG. 3 is an exploded perspective view of the invention shown in FIGS. 1 and 2; and FIG. 4 is a perspective view of the invention.

DETAILED DESCRIPTION OF THE INVENTION

Referring to FIGS. 1-4, a fiber optic transducer 10 includes a mandrel 12 having a first portion 13 that preferably is formed as a hollow cylinder of outer diameter $D_1$. An optical fiber 14 has a first portion 15 wound on the first portion 13 of the mandrel 12. The first portion 13 of the mandrel 12 is not required to be a cylinder. Other configurations such as ellipsoid or conical are possible. The essential requirement is that the mandrel 12 be formed so that optical fiber 14 may be wound thereon without breaking the optical fiber 14.

When the fiber optic transducer 10 is formed to respond to acoustic pressure, an acoustic wave that is incident thereon causes dimensional changes in the circumference of the mandrel 12, which modulates the phase of an optical signal propagating in the optical fiber 14. The phase changes can be processed to measure the acoustic pressure. The fiber optic transducer 10 may be used to detect changes in any physical parameter that change the dimensions of the first portion 13 of the mandrel 12. The geometric configuration and the material used to make the mandrel determine the parameter that the fiber optic transducer can be used to measure.

The mandrel includes a second portion 20 that may be formed as a solid cylindrical projection of diameter $D_2$ extending from the closed end 18 of the mandrel 12. The projection 20 and the first portion 13 of the mandrel 12 preferably are in coaxial alignment. The diameter $D_1$ of the first portion 13 of the mandrel 12 preferably is larger than the diameter $D_2$ of the projection 20.

The second portion 20 of the mandrel 12 is not restricted to a cylindrical configuration. It may be formed in a variety of shapes. Instead of the single projection shown, the second portion may include a plurality of projections. The second portion 20 may be formed integrally with the first portion 13 of the mandrel 12. Alternatively, the second portion 20 may be formed separately and then attached to the first portion 13 by any suitable means such as welding or by an adhesive.

An FBG 22 is formed in a second portion 24 of the optical fiber 14. The FBG 22 is wound around a grating collar 26 formed to have an inner passage 28 having the same shape as the second portion 20 of the mandrel 12. If the second portion 20 includes a plurality of projections, then the grating collar 26 has corresponding passages for receiving the projections therein. The grating collar 26 preferably fits closely on the second portion 20 as best shown in FIG. 2. The FBG 22 is designed to reflect a selected wavelength included in a broadband optical signal and to transmit other wavelengths. A sensor array (not shown) may be formed using a plurality of mandrels 12 with each having a corresponding grating collar 26 mounted thereon. The optical fiber 14 preferably has a selected portion (not shown) wound around each mandrel and grating collar. An FBG 22 is formed in each portion of the fiber 14 that is wound around one of the grating collars.

The grating collar 26 is designed to support the FBG 22 and prevent changes in the FBG due to environmental perturbations such as pressure and temperature changes that typically would affect the mandrel 12. The projection 20 provides an integrated solid support for the grating collar 26 and prevents differential pressure between the grating collar 26 and its supporting projection 20. It should be noted that the drawings are not formed to any scale. The relative diameters of the projection and the grating collar passage 28 may be varied to provide a collar wall 30 having a thickness sufficient to minimize effects of environmental perturbations.

The grating collar 26 may be formed of any one of a variety of materials such as glass, ceramic or fiberglass or a metal, including a nickel-iron alloy.

What is claimed is:

1. A fiber optic acoustic transducer, comprising:
   a mandrel formed as a thin-walled hollow cylinder having an open end and a closed end;
   a solid projection extending from the closed end of the mandrel in axial alignment therewith;
   a grating collar and having a passage extending therethrough for mounting the grating collar on the solid projection such that the grating collar is axially spaced apart from the mandrel; and
   an optical fiber having a first portion wound around the mandrel and a second portion wound around the grating collar with a fiber Bragg grating being formed in the second portion of the optical fiber.

2. The fiber optic transducer of claim 1 wherein the solid projection is formed as a cylinder and wherein the passage through the grating collar is formed as a cylinder for closely fitting on the projection such that the projection provides an integrated, solid support for the grating collar.

* * * * *